United States Patent [19]

Schierau

[11] Patent Number: 5,356,192

[45] Date of Patent: Oct. 18, 1994

[54] LIGHT SCREENING DEVICE

[76] Inventor: Peter Schierau, 42 Holm Crescent, Thornhill, Ontario, Canada, L3T 5J3

[21] Appl. No.: 78,916

[22] Filed: Jun. 21, 1993

[51] Int. Cl.⁵ .............................................. B60J 3/02
[52] U.S. Cl. .................... 296/97.6; 296/97.8; 296/97.11
[58] Field of Search ............ 296/97.4, 97.5, 97.6, 296/97.8, 97.9, 97.11; 248/231.4

[56] References Cited

U.S. PATENT DOCUMENTS

| | | | |
|---|---|---|---|
| 3,853,370 | 12/1974 | Barnhart | 296/97.6 |
| 3,948,554 | 4/1976 | Barbee | 296/97.6 |
| 4,090,732 | 5/1978 | Vistitsky | 296/97.8 |
| 4,623,188 | 11/1986 | Juraschek et al. | 296/97.8 X |
| 4,919,469 | 4/1990 | Aizawa et al. | 296/97.6 |
| 4,982,992 | 1/1991 | Vu et al. | 296/97.6 |
| 5,265,929 | 11/1993 | Pelham | 296/97.6 |

FOREIGN PATENT DOCUMENTS

| | | | |
|---|---|---|---|
| 468066 | 11/1952 | Italy | 296/97.8 |
| 315321 | 12/1988 | Japan | 296/97.8 |

Primary Examiner—Dean J. Kramer
Attorney, Agent, or Firm—David W. Wong

[57] ABSTRACT

A light screening device is provided with a clamping arrangement for attaching firmly and securely to the sun visor of an automotive vehicle. The clamp comprises two substantially T-shaped members slidably mounted to each other and includes a latching arrangement between the T-shaped members for locking the clamp in a selected size opening for attaching to sun visors of various sizes. The transparent light screen is slidably mounted to a bracket which is hingedly mounted to the clamp through a slider so that the light screen can be pivoted to a storage position juxtaposed to the sun visor or to a selected operative position below the sun visor. The light screen may also slide sideways relative to the sun visor to provide light screening in selected lateral positions.

13 Claims, 3 Drawing Sheets

LIGHT SCREENING DEVICE

BACKGROUND OF THE INVENTION

The present invention relates to a light screening device and particularly to a portable light screening device attachable to the sun visor of an automobile and operative to provide various light screening purposes to enhance the driver's view of the roadway.

When driving an automobile, the driver often encounters numerous situations in which the driver's view is subjected to glaring light impinging upon the eyes directly from the sun or from objects reflecting the sun's ray to the driver's face, the glaring light may also be from headlights of oncoming vehicles. Such glaring light may be, in the least situation, annoying to the driver; and, in the worse situation, may even cause momentary blinding to the driver's view of the roadway, and may thus cause an accident. Such problem may be overcome by the driver wearing sunglasses; however, sunglasses also may darken the driver's view of the roadway, and the instrument readings on the dashboard within the automobile. Therefore, it impedes with the driver's driving operation. Furthermore, for a driver requiring to wear prescription glasses, changing to sunglasses while driving is very troublesome and awkward to carry out while driving, and it can hamper with the driver's attention in driving and may therefore result in an accident. The above problems have been overcome by the provision of a glare shield mounted to the sun visor of the vehicle. The glare shield normally is located in a storage position behind the sun visor, and in a glaring light situation it may be swung to a position below the sun visor so as to screen the annoying glaring light shining directly onto the driver's face.

Many common glare shields suffer the main drawback that they are not rigidly mounted to the sun visor. Thus, they can accidentally become detached from the sun visor after a short period of use. The mounting of such glare shield commonly comprises a spring clip or clips slidably attaching the glare shield to the sun visor. Such clips cause unsightly marks in the sun visor and often actually cause tearing or other breakage in the sun visor. Furthermore, the shield can only be located at one position below the sun visor, so that if the glaring light such as the sun light directed at the driver's face from the sun located in the low horizon during the summer season, the shield can not provide the necessary screening to such low lying glaring light.

SUMMARY OF THE INVENTION

It is the primary object of the present invention to provide a light screening device which is adjustable to locate at selected vertical and lateral positions to screen out glaring light impinging on the driver's face in all directions through the front windshield of the automobile.

It is another object of the present invention to provide a light screening device which can be attached to the sun visor in the automobile firmly and securely without causing damage to the sun visor.

It is another object of the present invention to provide a light screening device having component parts which can be assembled or disassembled easily and quickly.

It is yet another object of the present invention to provide a light screening device having a rugged and relatively simple structure.

Briefly, the light screening device of the present invention is adaptable to a sun visor in an automobile and it comprises amounting means which is operative for attaching the device to the sun visor. The mounting means has an elongated body portion. A slider means is slidably coupled to the elongated body portion of the mounting means and it is operative to locate at a selected position on the latter. A bracket means is pivotally mounted to the slider means. The bracket means has a clasping member. A transparent light screening sheet member is slidably mounted to the bracket means. The upper edge portion of the light screening sheet member is slidably engaged with the clasping member of the bracket means so that the light screening sheet member can slide sideways to a selected lateral position relative to the mounting means.

DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 1:
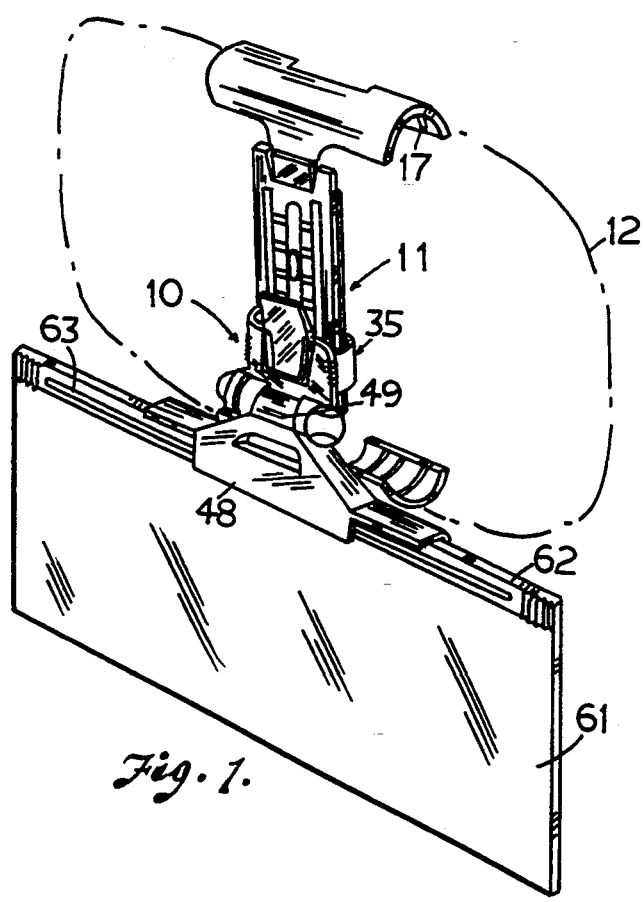
FIG. 1 is a perspective elevation view of the light screening device according to the present invention mounted on the sun visor of an automobile.
Figure 2:
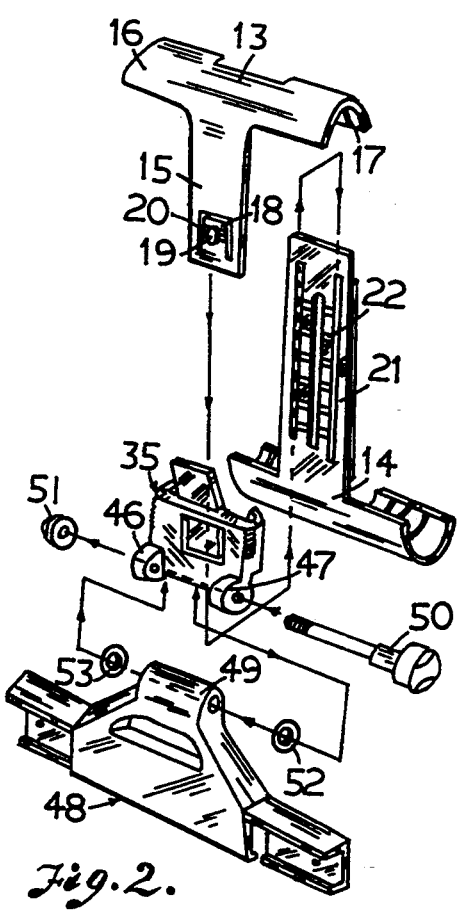
FIG. 2 is an exploded perspective elevation view of FIG. 1 to show the various component parts of the light screening device according to the present invention.

With reference to the drawings wherein like reference numerals designate corresponding parts in the several views, the light screening device 10 according to the present invention includes amounting means 11 for attaching it to the sun visor 12 in an automobile. The mounting means 11 comprises a generally T-shaped upper clamping member 13 and a generally inverted T-shaped lower clamping member 14 slidably mounted together to form an adjustable clamp for grasping the upper and lower edges of the sun visor 12 to securely and removably mounting the light screening device 10 to the sun visor 12.

Figure 3:
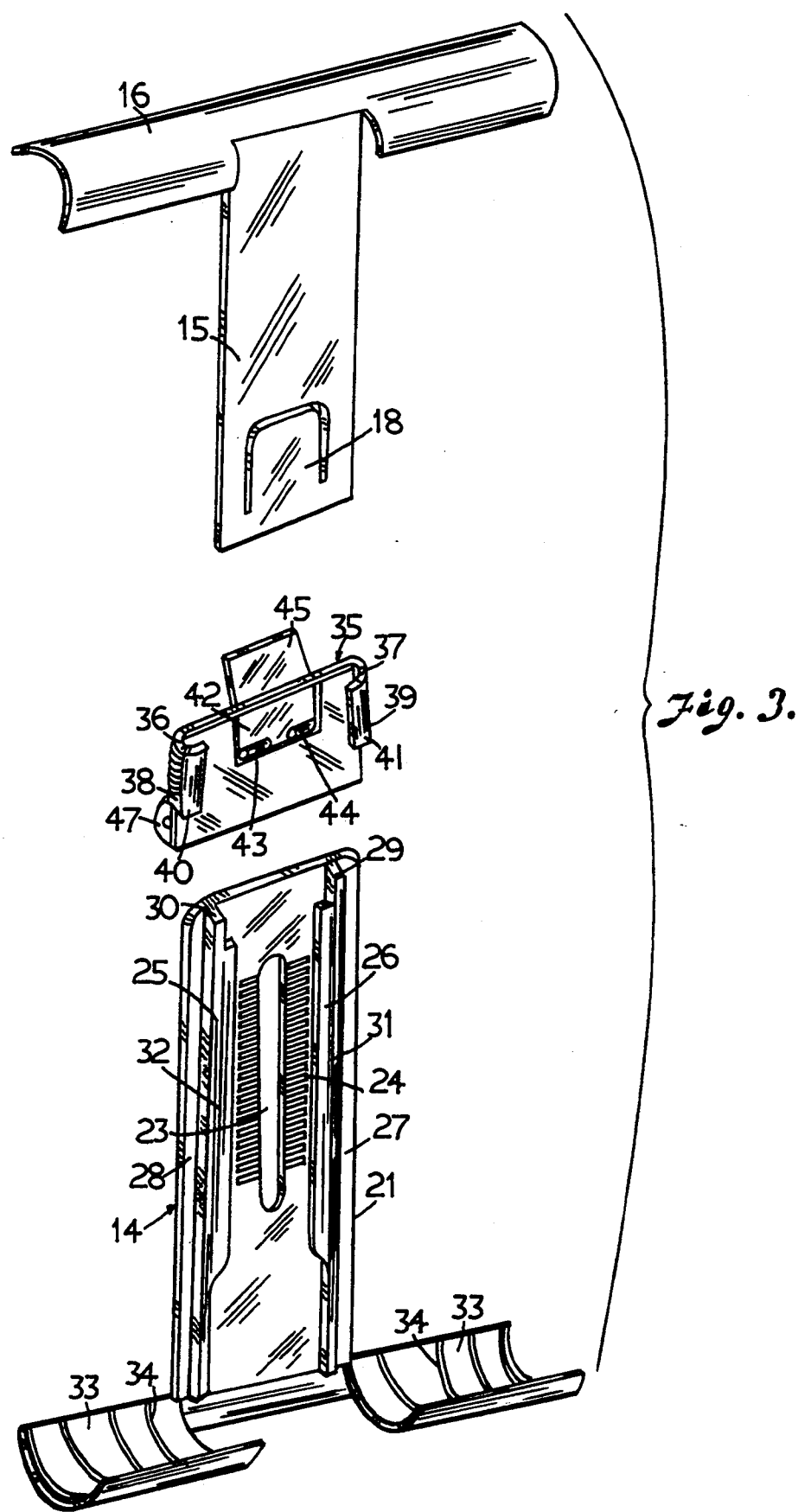
FIG. 3 is an exploded perspective elevation rear view of the upper and lower T-shaped mounting members and the slider member thereof.
Figure 4:
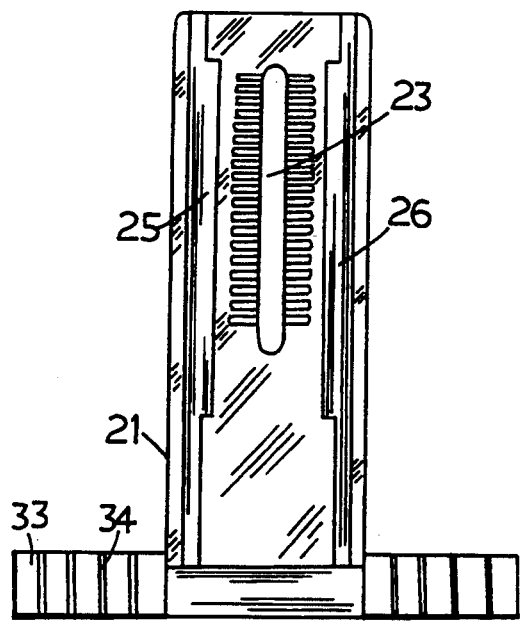
FIG. 4 is a rear elevation view of the upper T-shaped mounting member thereof.
Figure 5:
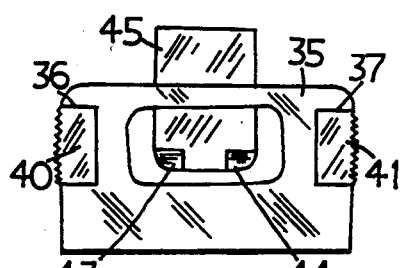
FIG. 5 is a front elevation view of the slider member thereof.
Figure 6:
FIG. 6 is a top elevation view of the slider member thereof.
Figure 7:
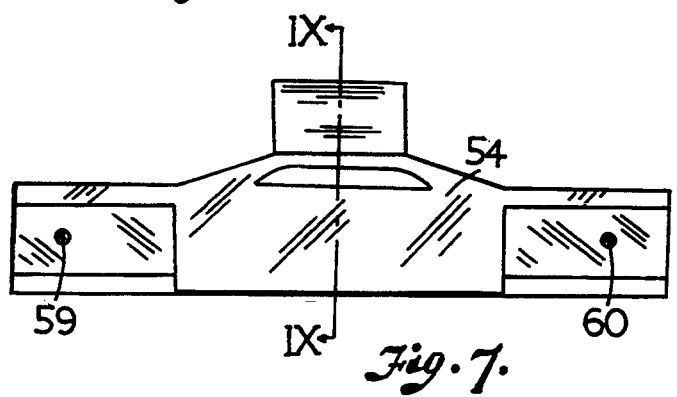
FIG. 7 is a front elevation view of the bracket member thereof.

The upper clamping member 13 has a vertical body portion 15 and a horizontal portion 16. The horizontal portion 16 preferably has a cross sectional curved hook shape curving downwardly so that in operation it can grasp the edge portion of the sun visor 12 tightly. A plurality of ridges 17 may be formed in the inside surface of the curved horizontal portion 16 to provide reinforcement therein as well as to eliminate the mounting 11 from sliding sideways once it is secured to the sun visor 12. A latching plate 18 is integrally formed at the lower edge portion of the vertical body portion 15 as best shown in FIGS. 3 and 4. A generally oval shaped projection 19 is formed on the front surface of the latching plate 18 and a plurality of horizontal ridges 20 are also formed in the upper edge portion of the front surface of the latching plate 18 as best shown in FIG. 4.

The lower clamping member 14 has a vertical body portion 21 which is longer in length than the vertical body portion 15 of the upper clamping member 13, and having a plurality of horizontal grooves 22 formed on its front surface. A vertical slot 23 is formed in the middle of the vertical body portion 21. The width of the vertical slot 23 is equal to the width of the oval shaped projection 19 formed on the latching plate 18 of the upper clamp member 13. A plurality of horizontal ridges 24 are formed on the rear surface of the vertical body portion 21 of the lower clamping member 14 along most of the length of the vertical slot 23. Two vertical restraining side guides 25 and 26 are formed along the edge portions of the vertical horizontal body portion 21 of the lower clamping member 14. The restraining side guides 25 and 26 are mutually parallel to each other and recessed a short distance from the respective sides of the vertical horizontal body portion 21 to provide two narrow side edge portions 27 and 28 along the vertical sides therein. The restraining side guides 25 and 26 have an L-shaped cross section consisting of vertical side guards 29 and 30 respectively extending throughout the entire length of the vertical body portion 21 of the lower clamping member 14, and rear guards 31 and 32 respectively having a length substantially equal to the length of the vertical body portion 15 of the upper clamping member 13 and extending downward from the top edge of the vertical body portion 21. The distance between the inside surfaces of the vertical side guards 29 and 30 is equal to the width of the vertical body portion 15 of the upper clamping member 13. A horizontal clasping portion 33 is formed at the lower end of the lower clamping member 14. The horizontal clasping portion 33 has a curve cross sectional shape having a mirror image of the horizontal portion 16 of the upper clamping member 13 and it is operative to serve as the lower clasping member of the clamp for securing the light screening device of the present invention to the sun visor 12. A plurality of reinforcement ridges 34 may also be formed on the inside surface of the clasping portion 33 for the same purposes as the reinforcement ridges formed on the inside surface of curved horizontal portion 16 of the upper clamping member 13.

The slider member 35 has a substantially C-shaped cross section having two slider guards 36 and 37 formed at its two sides respectively as best shown in FIG. 3. The slider guards 36 and 37 have an L-shape cross section including side walls 38 and 39 respectively and front walls 40 and 41 respectively. The distance between the inside surface of the side walls 38 and 39 is equal to the width of the vertical body portion 21 of the lower clamping member 14. A portion of the vertical edge of the side walls 38 and 39 may be knurled to facilitate gripping of the slider member 35 in operating the mounting means 10. A latching plate 42 is formed on the slider member 35. Two arcuate projections 43 and 44 are formed at the lower edge portion of the rear surface of the latching plate 42. These arcuate projections 43 and 44 will engage with the horizontal grooves 22 formed on the front surface of the lower clamping member 14 when the slider member 35 is mounted onto the lower clamping member 14 to latch the slider member 35 at any selected position therein. The latching plate 42 has an upper extension portion 45 extending upwardly and forwardly from the slider member 35 so that the latching plate 42 may be pivoted by pressing on the extension portion 45 to disengage the arcuate projections 43 and 44 from the associated groove 22 in the lower clamping member 14. Two spaced hinge portions 46 and 47 are formed on the front surface of the slider member 35.

Figure 9:
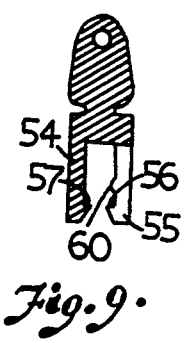
FIG. 9 is the partial sectional side elevation view of the bracket member along section line IX—IX of FIG. 7.
Figure 8:
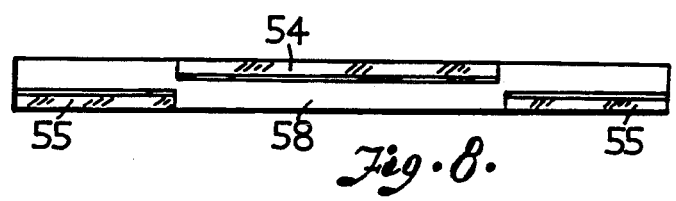
FIG. 8 is the bottom elevation view of the bracket member thereof.

A bracket member 48 having a hinge portion 49 therein is mounted to the slider member 35 by engaging it between the hinge portions 46 and 47 of the slider member 35 and securing it in place with a hinge pin 50 and mounting nut 51. The mounting friction between the slider member 35 and the bracket member 48 may be adjusted by tightening or loosening the mounting nut 51. The mounting friction may also be enhanced by the provision of two washers 52 and 53 which may be made of fibre or similar material or metal, located at the hinge between the slider member 35 and the bracket member 48. The bracket member 48 has a generally inverted U-shaped cross section as best shown in FIG. 9 and consists of spaced downwardly extending front skirting wall 54 and rear skirting wall 55. An inwardly extending lip 56 is formed in the lower edge portion of the inside surface of the front skirting wall 54; and similarly, an inwardly extending lip 57 is formed in the lower edge portion of the inside surface of the rear skirting wall 55. A cut out 58 may be provided in the rear skirting wall 55 to separate it into a left rear skirting wall and aright rear skirting wall. Two small projections 59 and 60 are formed on the inside surface of the rear skirting wall of the left rear skirting wall and right rear skirting wall.

The light screening sheet 61 of the present invention is provided with a thicker upper mounting edge portion 62. The thickness of the upper mounting edge portion 62 is equal to the width of the space between the rear skirting wall 55 and front skirting wall 54, and an elongated groove 63 is formed in the upper mounting edge portion 62. The light screening sheet 61 may be slidably mounted to the bracket member 48 by sliding engagement in the space between the front skirting wall 54 and rear skirting wall 55. The projections 59 and 60 formed on the inside surface of the rear skirting wall 55 will engage with the elongated groove 63 to hold the light screening sheet 61 in place. The light screening sheet 61 is held stable in place additionally with the engagement of the lips 56 and 57 of the skirting walls with the lower edge of the upper mounting edge portion 62 of the light screening sheet.

To assemble the light screening device of the present invention, the slider member 35 is first mounted to the lower clamping member 14 by slidably engaging the slider member 35 from the top of the vertical body portion 21 with the edge portions 27 and 28 inserted into the slider guards 36 and 37. Since the width of the vertical body portion 21 has the same dimensions as the width between the inner walls of the slider guards 36 and 37, the two parts will fit snugly in a sliding engagement. Once engaged, the slider member 35 may be latched at any selected position by the snap-engagement of the arcuate projections 43 and 44 with a selected groove 22 on the front surface of the vertical body portion 21 of the lower clamping member 14. The slider member 35 may be moved to another selected position by pressing down on the extension portion 45 of the latching plate 42 to temporarily disengage the arcuate projections 43 and 44 from the groove 22 and then slidably moving the slider member 35 to the new selected position at which the arcuate projections 43 and 44 will snap-engage with another one of the grooves 22 to latch the slider member 35 at the new position. The clamping means is then assembled by inserting the lower end of the vertical body portion 15 of the upper clamping member 13 into the space bounded by the vertical side guards 29 and 30 in the lower clamping member 14. Since the dimensions of the space between the vertical side guards 29 and 30 are the same as those of the vertical body portion 15 of the upper clamping member 13, the two parts will slidably fit snugly. Once inserted, the oval projection 19 of the latching plate 18 in the upper clamping member 13 will engage with the vertical slot 23 in the vertical body portion 21 of the lower clamping member 14 to provide additional alignment between the two clamping members. The size of the clamp opening may be varied by adjusting the sliding engagement between the two clamping members, and the opening may be fixed by the snap engagement between the horizontal ridges 20 formed on the latching plate 18 in the upper clamping member 13 and the horizontal ridges 24 formed on the rear surface of the vertical body portion 21 of the lower clamping body 14. The bracket 48 is mounted to the slider member 35 by securing them together through the hinge with the hinge pin 50 and mounting nut 51 as described previously. Finally, the light screening sheet 61 is slidably mounted to the bracket 48 also as described previously.

In use, the light screening device 10 is mounted to the sun visor 12 of the automobile by adjusting the clamping members 13 and 14 to clamp onto the sun visor securely and firmly. Normally, the light screening sheet 61 is folded in a storage position behind the sun visor 12 by pivoting it upwards relative to the hinge between the slider member 35 and bracket 48. When encountering a glaring light situation, the light screening sheet 61 can be conveniently and quickly swung downwards from the sun visor 12 to position in front of the driver's face. The vertical position of the light screening sheet 61 can be adjusted by sliding the slider member 35 along the lower clamping member 14, and its horizontal position can be adjusted by sliding it with respect to the bracket 48. The angle of the light screening sheet 61 with respect to the driver's face or line of sight may also be adjusted by pivoting the sheet relative to the hinge between the slider member 35 and the bracket 48 and adjusting the friction of the hinge by tightening the hinge pin 50 against the mounting nut 51 to maintain the light screening sheet 61 at the selected angle.

It can be appreciated that various type of light screening sheet or lenses may be used to provide special purposes for the driver. For example, a light enhancing lens may be provided to brighten the driver's view of the roadway in a dark overcast day.

Whilst in the illustrated embodiment presently preferred features of the invention have been put forward herein, it is to be understood that the invention is not limited to the precise forms illustrated herein as an example, and that changes may be made thereto without departing from the spirit and substance of the invention.

I claim is:

1. A light screening device adaptable to a sun visor in an automotive vehicle comprising,
   a mounting means operative for attaching said light screening device to said sun visor, said mounting means having an elongated body portion,
   a slider means slidably coupled to said elongated body portion of said mounting means and being operative to locate at a selected position on said elongated body portion, said elongated body portion extending in a downward manner from said sun visor when said light screening device is attached to said sun visor,
   a bracket means pivotally mounted to said slider means, said bracket means having an open bottom portion,
   transparent sheet member having one lateral side therein slidably mounted to said open bottom of said bracket means,
   a latching member formed on said slider means and a plurality of grooves formed on said elongated body portion, said latching member being cooperative with a selected one of said grooves to locate said slider means in a slidable snap-action at said selected position on said elongated body portion,
   said mounting means including a clamping means comprising a substantially T-shaped upper member and a substantially T-shaped lower member, said upper member and lower member being slidably coupled to each other to clasp an upper side and lower side respectively of said sun visor for attaching said light screening device to said sun visor.

2. A light screening device according to claim 1 including a locking means for maintaining said lower member and upper member in a selected position relative to each other whereby said clamping means secures the light screening device fixedly and removably on said sun visor.

3. A light screening device according to claim 2 wherein said locking means includes a plurality of ridges formed on said upper member and lower member.

4. A light screening device according to claim 3 including hinge means formed in said slider means, and associated hinge means formed in said bracket means, said hinge means and associated hinge means being coupled together through a friction adjusting means.

5. A light screening device according to claim 4 wherein said friction adjusting means includes a bolt extending through said hinge means and associated hinge means, and a nut coupled to said bolt and cooperative therewith for hingedly securing said slider means and bracket means together.

6. A light screening device according to claim 5 wherein said opening bottom portion of said bracket means has a generally inverted U-shaped cross section, including a downwardly extending front member and a downwardly extending rear member, said front member and rear member being mutually parallel and spaced from one another.

7. A light screening device adaptable to a sun visor an automotive vehicle comprising,
   a mounting means in the form of a clamp including a generally T-shaped upper member and a generally T-shaped lower member slidably coupled to one another to clamp onto an upper edge and a lower edge of said sun visor,
   said T-shaped lower member having a vertical body portion with a plurality of horizontal grooves formed on a front surface therein and a plurality of horizontal ridges formed on a rear surface therein, a slider member having a generally C-shaped horizontal cross section and having two generally L-shaped members formed at two opposite sides therein, said L-shaped member being operative to engage slidably with two vertical lateral sides of said vertical body portion of said T-shaped lower member, a bracket means hingedly secured to said slider member, said bracket means having a substantially inverted U-shaped vertical cross section and provided with an open bottom portion, a generally transparent light screening sheet lens having one lateral upper side therein slidably mounted to said open bottom portion of said bracket means whereby said sheet lens is slidable sideways with respect to said bracket means.

8. A light screening device according to claim 7 including a latching means comprising a cantilever member formed in a vertical body portion of said T-shaped upper member, said cantilever member having a plurality of associated horizontal ridges formed therein, said associated horizontal ridges being operative slidably engaged with said horizontal ridges on said rear surface of said vertical body portion for maintaining said clamp in a selected open size to secure the light screening device securely on said sun visor.

9. A light screening device according to claim 8 wherein said slider member includes a pivotal locking member therein, said locking member having two arcuate members formed therein, said arcuate members being operative to engage with a selected one of said horizontal grooves in said T-shaped lower member to maintain said slider member in a selected slidably locked position whereby to locate said sheet lens at a selected position below said sun visor.

10. A light screening device according to claim 9 wherein said bottom portion of said bracket means comprises at least two downwardly extending wall members parallel and spaced from one another and a protrusion member formed on an inside surface of one of said wall members, and said sheet lens having a horizontal groove in said sheet lens being operative slidably to engage with said protrusion member to maintain said sheet lens in a secure slidable engagement with said bracket means.

11. A light screening device according to claim 10 wherein said wallmembers includes inwardly extending lips, and said upper edge portion of said sheet lens includes a linear shoulder portion extending the entire horizontal length of said sheet lens, said lips of said wall members being operative to engage with said linear shoulder portion to prevent said sheet lens from accidentally disengage downwardly from said bracket means.

12. A light screening device according to claim 11 including a hinge means formed between said bracket means and said slider member, said hinge means having a friction adjusting means comprising a bolt extending through said hinge means and a securing nut, said bolt and nut being cooperative and adjustably for securing said bracket means and slider member in a selected angular position with respect to one another.

13. A light screening device according to claim 12 including at least two washer means in said hinge means and being operative to provide additional friction in said hinge means.

* * * * *